United States Patent
Wang et al.

(10) Patent No.: US 10,270,304 B2
(45) Date of Patent: Apr. 23, 2019

(54) LINEAR VIBRATION MOTOR

(71) Applicants: Hongxing Wang, Shenzhen (CN); Rongguan Zhou, Shenzhen (CN); Yue Chen, Shenzhen (CN)

(72) Inventors: Hongxing Wang, Shenzhen (CN); Rongguan Zhou, Shenzhen (CN); Yue Chen, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 236 days.

(21) Appl. No.: 15/403,514

(22) Filed: Jan. 11, 2017

(65) Prior Publication Data

US 2017/0222532 A1 Aug. 3, 2017

(30) Foreign Application Priority Data

Jan. 28, 2016 (CN) .......................... 2016 1 0059130

(51) Int. Cl.
*H02K 1/34* (2006.01)
*H02K 33/16* (2006.01)
*H02K 11/215* (2016.01)

(52) U.S. Cl.
CPC .............. *H02K 1/34* (2013.01); *H02K 33/16* (2013.01); *H02K 11/215* (2016.01)

(58) Field of Classification Search
CPC ......... H02K 1/34; H02K 11/215; H02K 33/16
See application file for complete search history.

(56) References Cited

U.S. PATENT DOCUMENTS 5,736,797 A * 4/1998 Motohashi ............. H02K 33/16
310/36
2016/0254736 A1* 9/2016 Jin ......................... H02K 33/16
310/25

FOREIGN PATENT DOCUMENTS

CN        103792640 A  *  5/2014

OTHER PUBLICATIONS

Machine translation of CN 103792640 A retrieved from Espacenet (2014).*

* cited by examiner

*Primary Examiner* — Quyen P Leung
*Assistant Examiner* — Minki Chang
(74) *Attorney, Agent, or Firm* — Na Xu; IPro, PLLC

(57) ABSTRACT

A linear vibration motor is disclosed. The linear vibration motor includes a housing; a vibrating unit in the housing, the vibrating unit including a magnet; a plurality of elastic members suspending the vibrating unit elastically in the housing; a drive coil positioned opposed to the magnet for driving the vibrating unit to vibrate along a first direction; a Hall sensor fixed on the housing and facing the magnet for detecting displacement of the vibrating unit along a direction vertical to the first direction; and a braking coil arranged on the housing and surrounding the Hall sensor for reacting upon the vibrating unit in accordance with the displacement detected by the Hall sensor in order to adjust the displacement of the vibrating unit vertical to the first direction.

5 Claims, 4 Drawing Sheets

LINEAR VIBRATION MOTOR

FIELD OF THE INVENTION

The invention is related to the technology of vibrators, and especially relates to a linear vibration motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

In the existing linear motor, the vibrator is usually suspended in the space of the housing by using the spring, and the vibrating direction thereof refers to the direction along with certain axis. The spring shall provide the vibrator with forces in multiple directions, for example, the spring shall provide certain rigidity in the direction if the working direction of the vibrator is the a first direction along with the horizontal plane of the device in order to provide the vibrator with a reset force for reciprocating motion; at the same time, the spring shall also provide certain rigidity in the non-first direction, for example the direction of minor axis or the vertical direction of the horizontal plane; therefore, the vibrator shall not generate over-sized vibrating amplitude in these non-first working direction. Otherwise, the noise may by generated easily when the vibrator is collided with the housing (or enough distance must be reserved between the vibrator and the housing in order to avoid collision; however the quality of the vibrator shall be reduced, thereby leading to loss of the vibration quantity). Moreover, the vibrator may be collided with the housing easily because the rigidity of the existing spring structure is often insufficient in the non-motion direction.

Therefore, it is necessary to provide an improved linear vibration motor to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to several exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
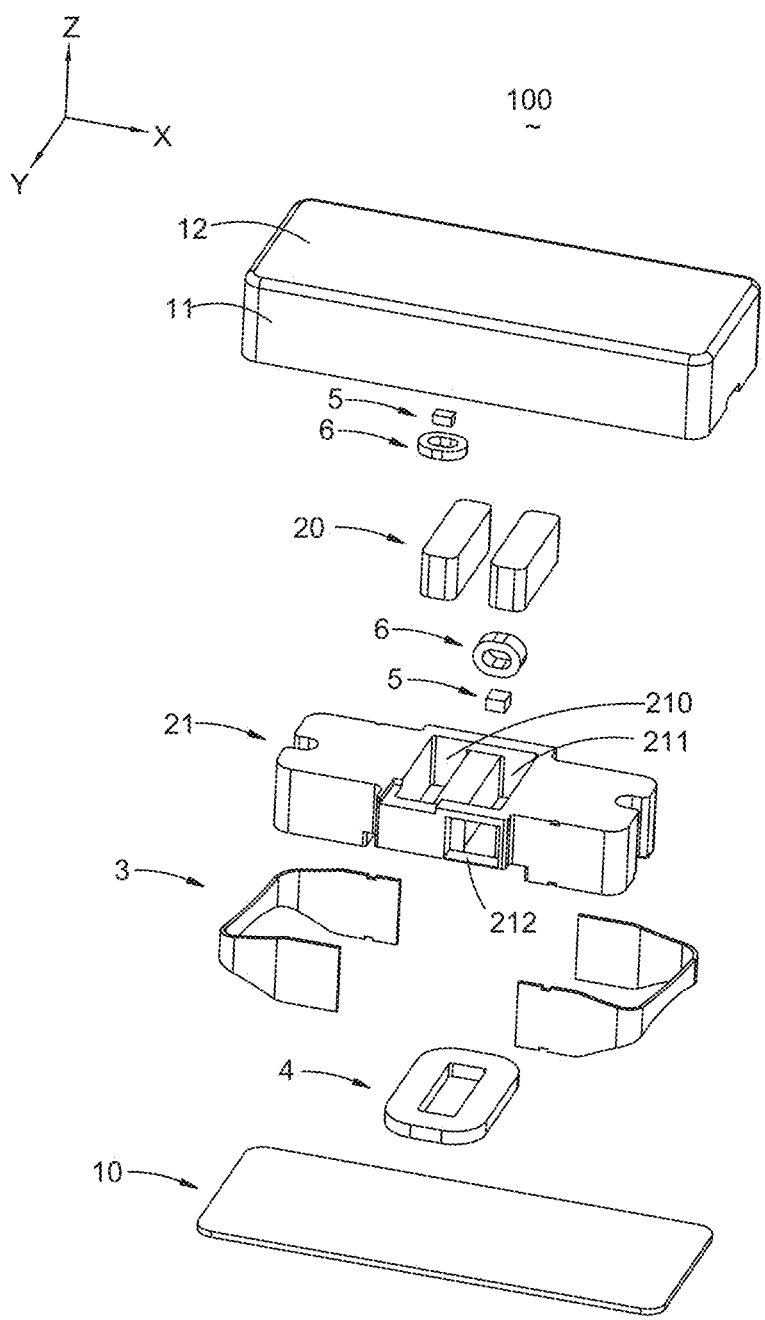
FIG. 1 is an exploded view of a linear vibration motor in accordance with an exemplary embodiment of the present disclosure.
Figure 2:
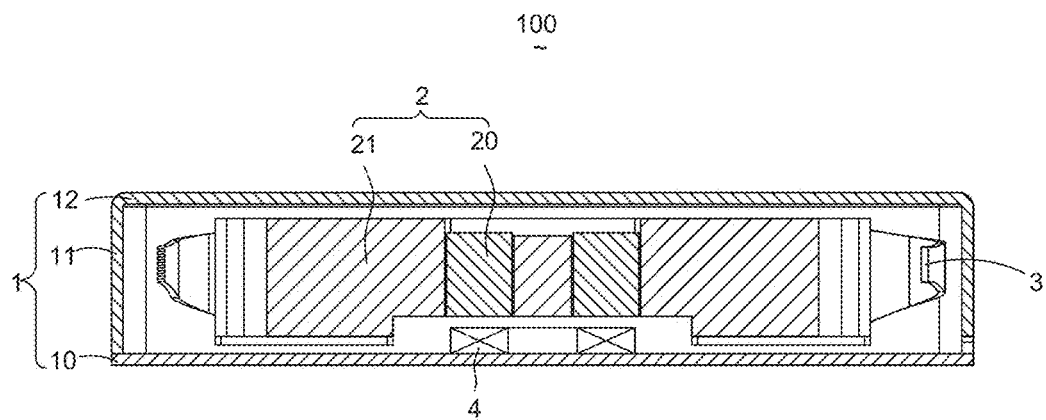
FIG. 2 is a cross-sectional view of the linear vibration motor in FIG. 1.

As shown in FIGS. 1-2, a linear vibration motor 100 comprises a housing 1, a vibrating unit 2 which is accommodated in the housing 1 and vibrates along a first direction X, a plurality of elastic members 3 which support the vibrating unit 2 elastically in order to suspend the vibrating unit 2 in the housing 1, and a drive coil 4 which drives the vibrating unit 2 to vibrate and is fixed on the housing 1. The vibrating unit 2 comprises a magnet 20 for generating a magnetic field; and the magnetic field generated by the drive coil 4 interacts with the magnetic field generated by the magnet 20, therefore the vibrating unit 2 is promoted to implement reciprocating vibration in the housing 1 along the first direction X.

The housing 1 comprises a base 10 which is applied to fixation of the drive coil 4, a side wall 11 which is vertical to the base 10 and a cover plate 12 which is far away from the base 10 and parallel with the base 10.

Figure 3:
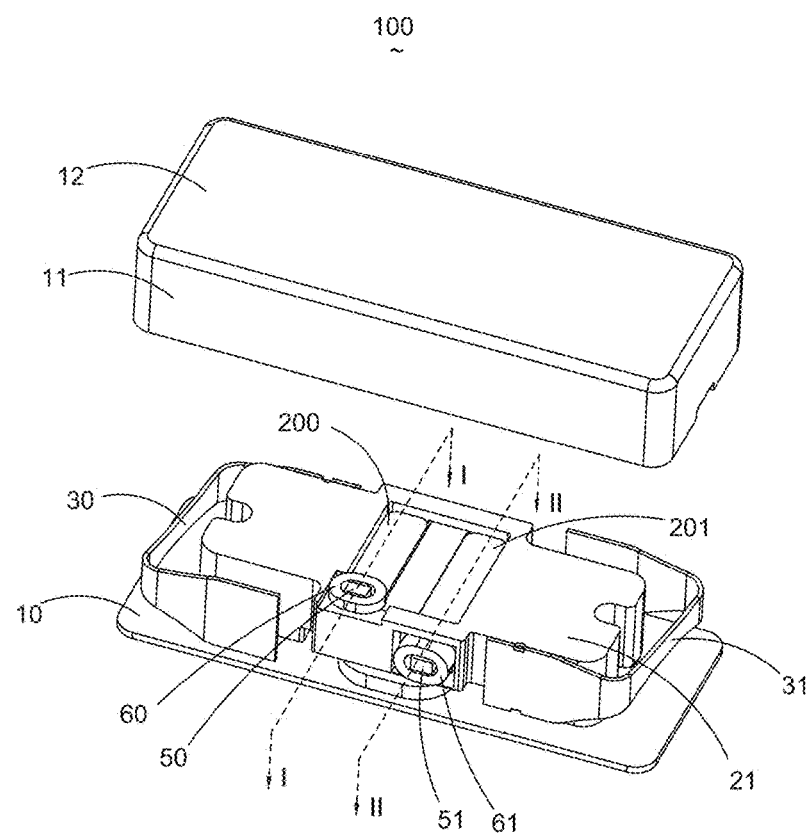
FIG. 3 is an assembled view of the linear vibration motor, a housing thereof being removed.
Figure 4:
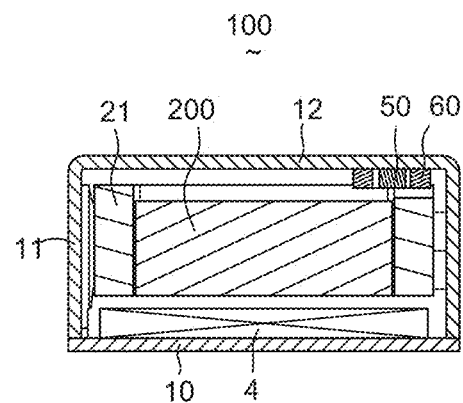
FIG. 4 is a cross-sectional view of the linear vibration motor taken along line I-I of FIG. 3.
Figure 5:
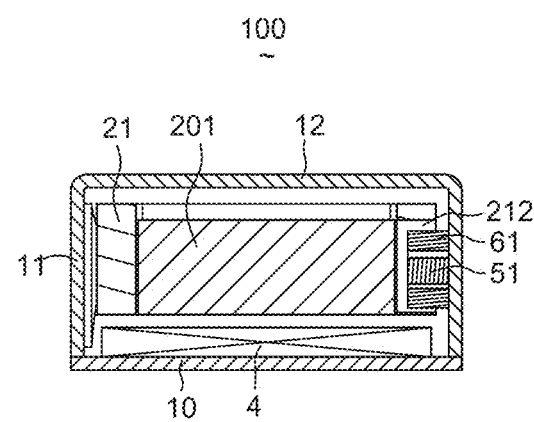
FIG. 5 is a cross-sectional view of the linear vibration motor taken along line II-II of FIG. 3.

Further referring to FIGS. 3-5, the vibrating unit 2 further comprises a counterweight 21 matching with the magnet 20. The magnet 20 comprises a first magnet 200 which is vertical to the first direction X and a second magnet 201 which is parallel with the first magnet 200. The counterweight 21 is provided with a first accommodation hole 210 and a second accommodation hole 211 which pass through an upper surface and a lower surface thereof in order to accommodate the first magnet 200 and the second magnet 201.

The motor 100 further comprises a Hall sensor 5 which is fixed on the housing 1 and faces the magnet 20 and a braking coil 6 which is fixed on the housing 1 and surrounds the Hall sensor 5. The Hall sensor 5 is applied to detection of displacement of the vibrating unit 2 along with the direction vertical to the first direction X and opposite to the Hall sensor 5; the braking coil 6 reacts upon the vibrating unit 2 in accordance with the displacement detected by the Hall sensor 5 and on the basis of the law of Lorentz force in order to adjust the displacement of the vibrating unit 2 in the direction vertical to the first direction X. Moreover, the distance of the Hall sensor 5 and the drive coil away from the vibrating unit 2 shall be greater than the maximum displacement of the vibrating unit 2 in the direction vertical to the first direction X.

The Hall sensor 5 works on the basis of principle that the distance of the vibrating unit 2 with respect to the Hall sensor 5 can be acquired in accordance with changes of intensity when the magnetic field generated by the magnet 20 passes through the magnetic field of the Hall sensor 5. The direction of the magnetic field generated by the braking coil 6 upon being electrified is identical with or opposite to the one of the magnetic field generated by the magnet 20 along with the direction vertical to the first direction X and passing through the braking coil 6. The magnetic fields with different intensities shall be generated by the braking coil 6 in accordance with the displacement of the vibrating unit 2 along with the direction vertical to the first direction, wherein the displacement is detected by the Hall sensor 5 and is opposite to the Hall sensor 5; in this way, the braking coil 6 can adjust the displacement of the whole vibrating unit 2 in the direction vertical to the first direction X by using the interacting force between the braking coil 6 and the magnet 20.

The Hall sensor 5 comprises a first Hall sensor 50 which is arranged on the cover plate 12 and a second Hall sensor 51 which is arranged on the side wall 11. The braking coil 6 comprises a first braking coil 60 which is used with the first Hall sensor 50 and arranged opposite to the first magnet 200 and a second braking coil 61 which is used with the first Hall sensor 50 and arranged opposite to the second magnet 201. The first braking coil 60 reacts upon the first magnet 200 in order to adjust the displacement of the vibrating unit 2 along with a second direction Z, wherein the second direction Z is vertical to the first direction X; while the second braking coil 61 reacts upon the second magnet 201 in order to adjust the displacement of the vibrating unit 2 along with a third direction Y, wherein the third direction Y is vertical to the first direction X and the second direction Z, respectively.

Figure 6:
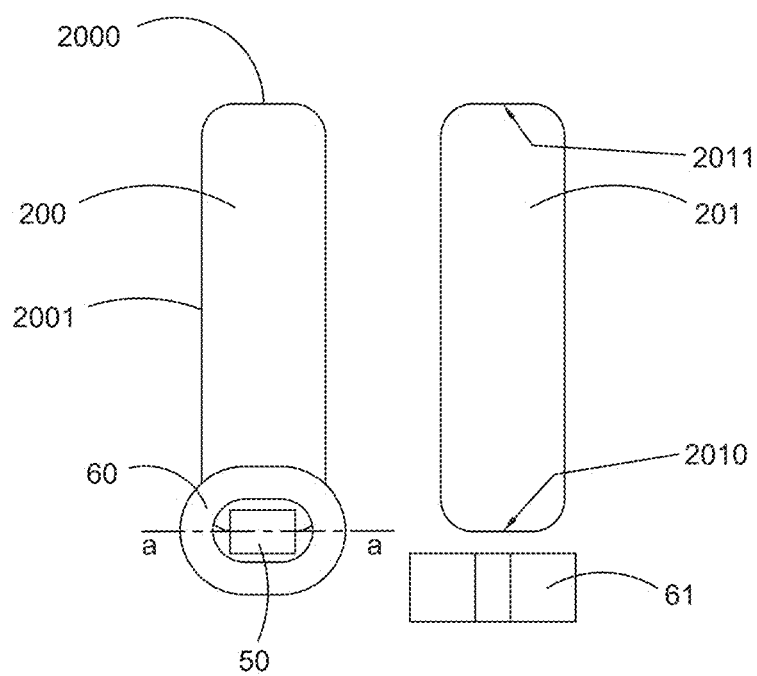
FIG. 6 is an illustration showing the position relationship between a magnet and a braking coil, from a first aspect.

The first magnet 200 is presented as a long rectangle strip; a central line a-a of the first braking coil 60 is overlapped with a minor axis side 2000 of the first magnet 200 in the second direction Z, therefore the line of magnetic force generated by the first magnet 200 can pass through the first braking coil 60 as much as possible, as shown in FIG. 6.

Figure 7:
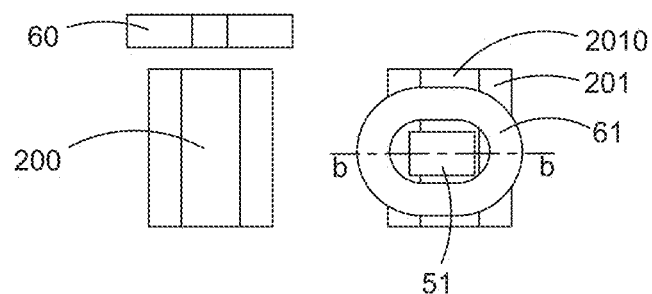
FIG. 7 is an illustration showing the position relationship between the magnet and the braking coil, from a second aspect.

The second magnet 201 is presented as the long rectangle strip; the second magnet 201 comprises a first end surface 2010 and a second end surface 2011 which are arranged at interval along the first direction X; the second braking coil 61 is arranged, facing the first end surface 2010 of the second magnet 201; and a central line b-b thereof is overlapped with the central line of the first end surface 2011 in the third direction Y; therefore, the line of magnetic force generated by the first magnet 201 can pass through the second braking coil 61 as much as possible, as shown in FIG. 7.

The counterweight 21 is provided with a through hole 212 which faces the first end surface 2010 in the third direction Y; the through hole 212 passes through the side surface of the counterweight 21 to reach the second accommodation hole 211 and is arranged between the first end surface 2010 and the second braking coil 61.

The braking coil 6 is presented as a hollow ring, and a central axis thereof is vertical to the first direction X because the direction of the magnetic field generated by the braking coil 6 upon being electrified is parallel with the central axis thereof. Therefore, direction of the magnetic field generated by the braking coil 6 shall be vertical to the first direction X in order to make the braking coil 6 limit the displacement of the vibrating unit 2 in the direction vertical to the first direction.

The elastic member 3 comprises a first spring 30 and a second spring 31 which are fixed on two ends of the vibrating unit 2 along the first direction X, respectively. In this embodiment, the first spring 30 and the second spring 31 are U-shaped spring, and one end of each is fixed on the counterweight 21, and the other end thereof is fixed on the housing, more specifically the other end of each spring is fixed on the side wall 11.

The linear motor in the invention can reduce the displacement of the vibrating unit 2 in the direction vertical to the vibrating direction effectively; therefore the motor 100 can implement vibration more stably, and the vibrating unit 2 can be prevented from collision with the housing 1.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
   a housing;
   a vibrating unit in the housing, the vibrating unit including a magnet;
   a plurality of elastic members suspending the vibrating unit elastically in the housing;
   a drive coil positioned opposed to the magnet for driving the vibrating unit to vibrate along a first direction, the drive coil being fixed on the housing;
   a Hall sensor fixed on the housing and facing the magnet for detecting displacement of the vibrating unit along a direction vertical to the first direction; and
   a braking coil arranged on the housing and surrounding the Hall sensor for reacting upon the vibrating unit in accordance with the displacement detected by the Hall sensor in order to adjust the displacement of the vibrating unit vertical to the first direction,
   wherein the housing includes a base for fixing the drive coil, a side wall arranged vertical to the base and a cover plate far away from the base and parallel with the base; the magnet comprises a first magnet which is vertical to the first direction and a second magnet which is parallel with the first magnet; the Hall sensor comprises a first Hall sensor which is arranged on the cover plate and a second Hall sensor which is arranged on the side wall; the braking coil comprises a first braking coil corresponding to the first Hall sensor and arranged opposite to the first magnet, and a second braking coil corresponding to the second Hall sensor and arranged opposite to the second magnet; the first braking coil reacts upon the first magnet in order to adjust the displacement of the vibrating unit along a second direction vertical to the first direction, the second braking coil reacts upon the second magnet in order to adjust the displacement of the vibrating unit along a third direction vertical to the first direction and the second direction, respectively; the vibrating unit further comprises a counterweight which is matched with the magnet, the counterweight is provided with a first accommodation hole and a second accommodation hole passing through an upper surface and a lower surface thereof in order to accommodate the first magnet and the second magnet the second magnet comprises a first end surface and a second end surface opposed to the first end surface along the first direction; the second braking coil is arranged to face the first end of the second magnet the counterweight is provided with a through hole facing the first end surface in the third direction, the through hole passes through side surface of the counterweight to reach the second accommodation hole and is arranged between the first end surface and the second braking coil.

2. The linear vibration motor as described in claim 1, wherein the first magnet is a long rectangle strip; and a central line of the first braking coil is overlapped with a minor axis side of the first magnet in the second direction.

3. The linear vibration motor as described in claim 1, wherein the second magnet is a long rectangle strip; and a central line of the second braking coil is overlapped with a central line of the first end surface in the third direction.

4. The linear vibration motor as described in claim 1, wherein the braking coil is a hollow ring, and a central axis thereof is vertical to the first direction.

5. The linear vibration motor as described in claim 1, wherein the elastic member comprises a first spring and a second spring fixed on two ends of the vibrating unit along the first direction, respectively.

* * * * *